United States Patent
Yokoyama et al.

(10) Patent No.: US 8,314,444 B2
(45) Date of Patent: Nov. 20, 2012

(54) PIEZORESISTIVE PRESSURE SENSOR

(75) Inventors: Shinya Yokoyama, Niigata-ken (JP); Daigo Aoki, Niigata-ken (JP); Yutaka Takashima, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 13/176,351

(22) Filed: Jul. 5, 2011

(65) Prior Publication Data

US 2011/0260269 A1 Oct. 27, 2011

Related U.S. Application Data

(63) Continuation of application No. PCT/JP2009/070497, filed on Dec. 7, 2009.

(30) Foreign Application Priority Data

Jan. 6, 2009 (JP) ................................. 2009-001010

(51) Int. Cl.
*H01L 29/66* (2006.01)

(52) U.S. Cl. ............... 257/108; 257/785; 257/E27.006; 257/E29.324; 438/117

(58) Field of Classification Search .................. 257/108, 257/785, E27.006, E29.324; 438/117
See application file for complete search history.

(56) References Cited

U.S. PATENT DOCUMENTS

| 4,588,472 | A | * | 5/1986 | Shimizu .......................... 438/53 |
| 4,814,856 | A | * | 3/1989 | Kurtz et al. ...................... 338/4 |
| 5,002,901 | A | * | 3/1991 | Kurtz et al. ..................... 438/51 |
| 5,537,882 | A | * | 7/1996 | Ugai et al. ...................... 73/727 |
| 6,150,917 | A | * | 11/2000 | Meyer et al. ...................... 338/4 |
| 7,617,736 | B2 | * | 11/2009 | Tang et al. ...................... 73/777 |
| 2011/0214505 | A1 | * | 9/2011 | Aoki et al. ...................... 73/727 |

FOREIGN PATENT DOCUMENTS

| JP | 03-137532 | 6/1991 |
| JP | 04-247667 | 9/1992 |
| JP | 2000-147000 | 5/2000 |
| JP | 2004-327551 | 11/2004 |

* cited by examiner

*Primary Examiner* — Jarrett Stark
*Assistant Examiner* — Nicholas Tobergte
(74) *Attorney, Agent, or Firm* — Brinks Hofer Gilson & Lione

(57) ABSTRACT

A piezoresistive pressure sensor is provided, which can prevent the occurrence of ESD breakdown due to the nearness of interconnection layers of a resistive element according to miniaturization thereof. The piezoresistive pressure sensor is so configured that respective semiconductor resistive layers on both sides of an arrangement are formed to be relatively longer than an adjacent semiconductor resistive layer, and thus a corner portion of a semiconductor connection layer that extends from the respective semiconductor resistive layers on both sides of the arrangement and a corner portion of the semiconductor interconnection layer that is nearest to the corner portion of the semiconductor connection layer, between which the ESD breakdown occurs easily, can be separated from each other.

5 Claims, 4 Drawing Sheets

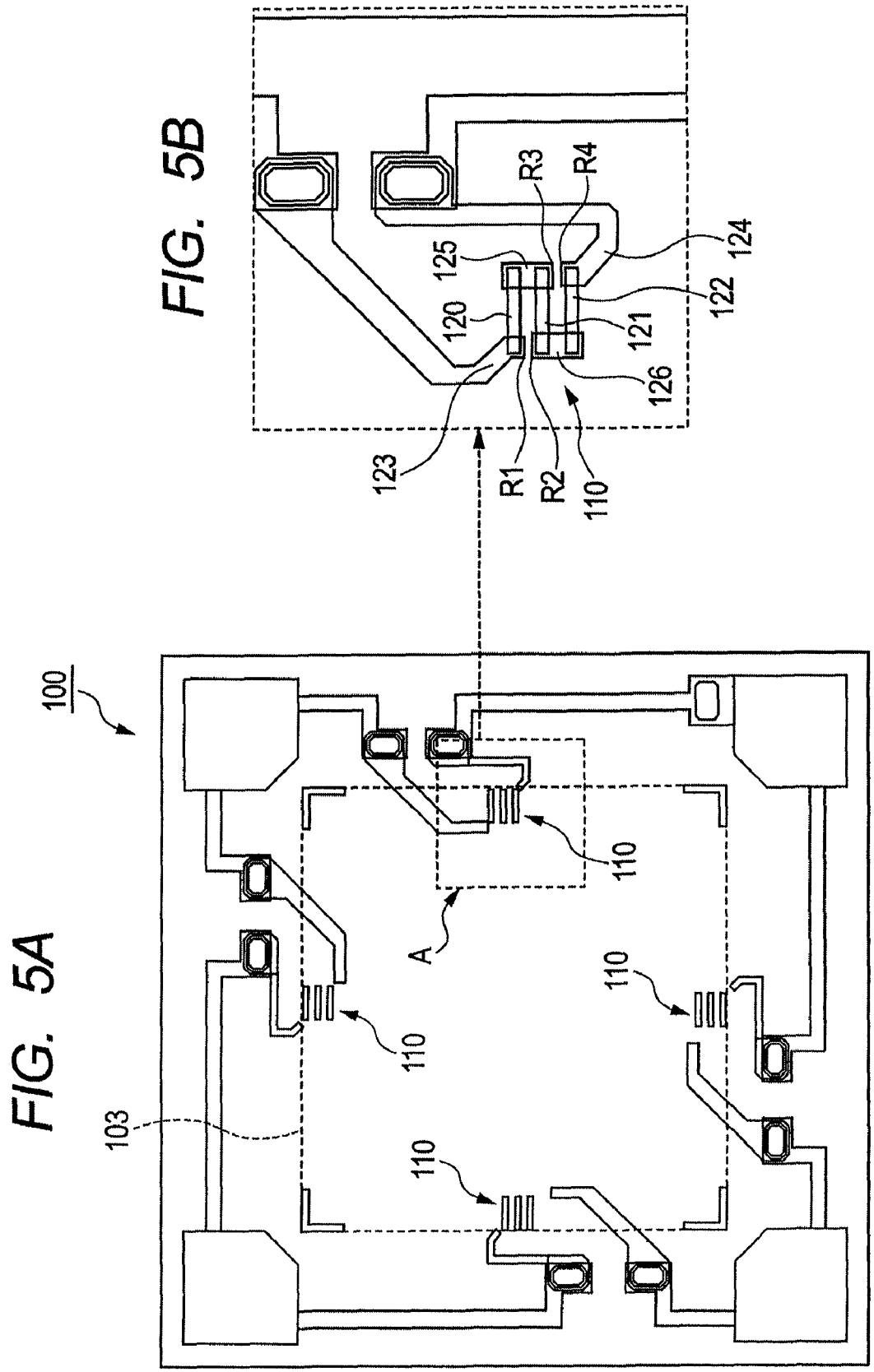

US 8,314,444 B2

PIEZORESISTIVE PRESSURE SENSOR

CLAIM OF PRIORITY

This application is a Continuation of international Application No. PCT/JP2009/070497 filed on Dec. 7, 2009, which claims benefit of Japanese Patent Application No. 2009-001010 filed on Jan. 6, 2009. The entire contents of each application noted above are hereby incorporated by reference.

BACKGROUND

1. Field of the Disclosure

The present disclosure relates to a pressure sensor, and more particularly to a piezoresistive pressure sensor that is formed using MEMS technology.

2. Description of the Related Art

In the related art, as a pressure sensor that is formed using MEMS (Micro Electro Mechanical System) technology, a piezoresistive pressure sensor that uses a piezo element of which the resistance value is changed according to the deformation of a diaphragm is known (for example, see Patent JP-A-61-267372 (Document 1) and JP-A-11-68118 (Patent Document 2).

The piezoresistive pressure sensor 100, for example, as illustrated in FIG. 5A, is configured by forming piezo elements 110 approximately in the centers of respective edges of a diaphragm 103. Further, as clearly illustrated in FIG. 5B, each piezo element 110 is formed in a meander shape in which three semiconductor resistive layers 120, 121, and 122 are installed side by side at intervals, and the respective semiconductor resistive layers 120, 121, and 122 are connected by semiconductor interconnection layers 125 and 126 having a lower resistance than that of the semiconductor resistive layers 120, 121, and 122. Further, at both ends of the piezo element 110 that is formed in a meander shape, low-resistance semiconductor interconnection layers 123 and 124 are connected.

With the miniaturization of the pressure sensor 100, the distance between the interconnection layers that constitute the pressure sensor has been shortened. Particularly, in the piezoresistive pressure sensor, in terms of the principle that the resistance value of a piezo element is changed according to the deformation of a diaphragm, it is required to miniaturize the entire size of the piezoresistive pressure sensor while the arrangement shape of a semiconductor layer is not changed but is similarly maintained. Due to this, if the size is reduced to miniaturize the interconnection, for example, if the corner size of 1 mm (the width of 12 µm of the semiconductor layer) is miniaturized to the corner size of 0.5 mm (the width of 9 µm of the semiconductor layer), the distance between the interconnection layers is remarkably shortened, for example, to be equal to or less than 4 µm. Accordingly, if a voltage is applied to the circuit, the electric field distribution becomes non-uniform, and thus an ESD (ElectroStatic Discharge) breakdown may easily occur in an area where the electric field distribution is heightened. In particular, the ESD breakdown may easily occur between one corner portion R2 of the low-resistance semiconductor interconnection layer 126 that connects the high-resistance semiconductor resistive layers 121 and 122 together and a corner portion R1 of the low-resistance semiconductor interconnection layer 123 that extends from the high-resistance semiconductor resistive layer 120, and between one corner portion R3 of the low-resistance semiconductor interconnection layer 125 that connects the high-resistance semiconductor resistive layers 120 and 121 together and a corner portion R4 of the low-resistance semiconductor interconnection layer 124 that extends from the high-resistance semiconductor resistive layer 122.

SUMMARY

There is provided a piezoresistive pressure sensor, which includes a diaphragm formed on a silicon substrate, and a plurality of piezo elements of which the resistance values are changed according to deformation of the diaphragm, wherein each of the piezo elements is so configured that at least three semiconductor resistive layers are arranged in parallel at predetermined intervals on a surface of the diaphragm, and the respective semiconductor resistive layers arranged in parallel are electrically connected in series by semiconductor interconnection layers having a lower resistance than that of the semiconductor resistive layers, and the semiconductor resistive layers on both sides of the arrangement are electrically connected to a semiconductor connection layer having a lower resistance than that of the semiconductor resistive layers, respectively, and wherein in the case where a ratio of sheet resistance of the semiconductor interconnection layers to sheet resistance of the semiconductor resistive layers is about 0.06 to about 0.28, the shortest distance between the semiconductor interconnection layer and the semiconductor connection layer is about 5 µm to about 20 µm.

In another aspect of the present invention, there is provided a piezoresistive pressure sensor, which includes a diaphragm formed on a silicon substrate, and a plurality of piezo elements of which the resistance values are changed according to deformation of the diaphragm, wherein each of the piezo elements is so configured that at least three semiconductor resistive layers are arranged in parallel at predetermined intervals on a surface of the diaphragm, and the respective semiconductor resistive layers arranged in parallel are electrically connected in series by semiconductor interconnection layers having a lower resistance than that of the semiconductor resistive layers, and the semiconductor resistive layers on both sides of the arrangement are electrically connected to semiconductor connection layers having a lower resistance than that of the semiconductor resistive layers, respectively, and wherein parallel opposite portions of all the semiconductor resistive layers which are arranged in parallel have the same length, and one end of the semiconductor resistive layer on both sides of the arrangement is bent so that the corner portion thereof is spaced apart from the corner portion of the nearest semiconductor interconnection layer.

The piezoresistive pressure sensor according to the present invention may include a diaphragm formed on a silicon substrate, and a plurality of piezo elements of which the resistance values are changed according to deformation of the diaphragm, wherein each of the piezo elements is so configured that at least three semiconductor resistive layers are arranged in parallel at predetermined intervals on a surface of the diaphragm, and the respective semiconductor resistive layers arranged in parallel are electrically connected in series by semiconductor interconnection layers having a lower resistance than that of the semiconductor resistive layers, and the semiconductor resistive layers on both sides of the arrangement are electrically connected to semiconductor connection layers having a lower resistance than that of the semiconductor resistive layers, respectively, and wherein in the case where a ratio of sheet resistance of the semiconductor interconnection layers to sheet resistance of the semiconductor resistive layers is about 0.06 to about 0.28, the shortest distance between the semiconductor interconnection layer and the semiconductor connection layer is about 5 µm to about 20 μm, and thus the pressure sensor can prevent the occurrence of ESD breakdown due to the nearness of miniaturized interconnection layers of a resistive element.

BRIEF DESCRIPTION OF THE DRAWINGS

FIG. 5A is a plan view of a pressure sensor in the related art, and FIG. 5B is an enlarged view of a portion A in FIG. 5A.

DESCRIPTION OF THE EXEMPLARY EMBODIMENTS

Hereinafter, preferred embodiments of the present invention will be described in detail with reference to the accompanying drawings. In the following description, the term "formed to be long" means that the length extending along the direction in which current flows is formed to be long.

Figure 1A:
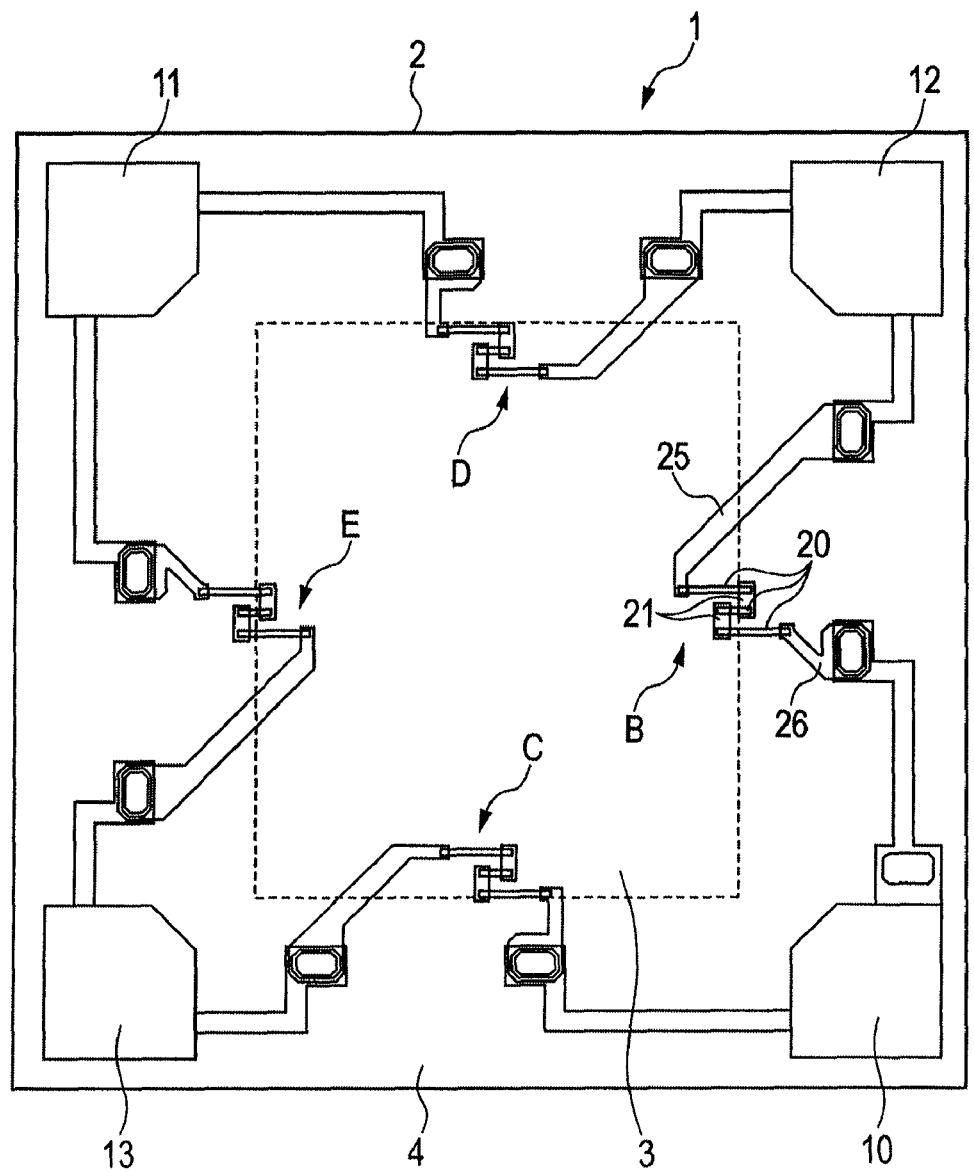
FIG. 1A is a plan view of a piezoresistive pressure sensor according to an embodiment of the invention.
Figure 1B:
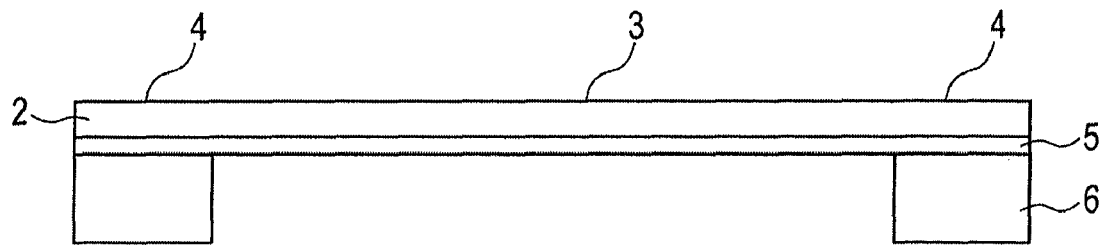
FIG. 1B is a side view thereof.
Figure 2:
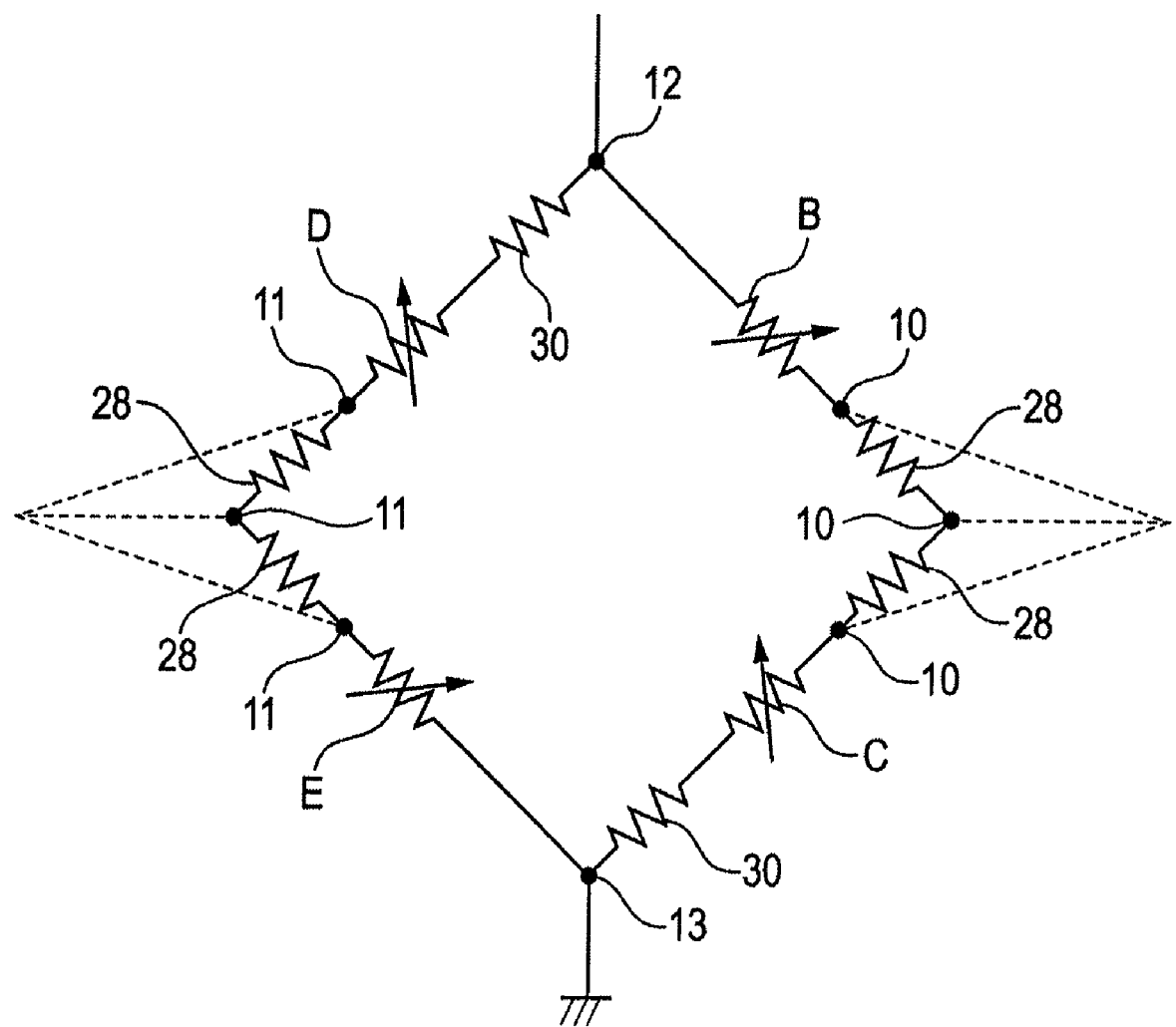
FIG. 2 is a circuit diagram of a piezoresistive pressure sensor according to an embodiment of the invention.

FIGS. 1A and 1B are a plan view and a side view illustrating a piezoresistive pressure sensor according to an embodiment of the invention, and FIG. 2 is a circuit diagram of a piezoresistive pressure sensor according to an embodiment of the invention.

Hereinafter, the wording "P+ type semiconductor layer" and "P++ type semiconductor layer" will be used. "P+ type semiconductor layer" and "P++ type semiconductor layer" are all P type semiconductors formed by doping, for example, boron into a silicon substrate. "P++ type semiconductor layer" has a larger doping amount than the "P+ type semiconductor layer", and the doping amount (impurity concentration) in the "P+ type semiconductor layer" is about $10^{18}$ cm$^{-3}$. On the other hand, the doping amount (impurity concentration) in the "P++ type semiconductor layer" is about $10^{20}$ cm$^{-3}$. Further, the "P++ type semiconductor layer" has a lower resistivity than the "P+ type semiconductor layer".

A piezoresistive pressure sensor 1 illustrated in FIGS. 1A and 1B is used for absolute pressure detection or gauge pressure detection. The piezoresistive pressure sensor 1 illustrated in FIGS. 1A and 1B is formed using, for example, an SOI (Silicon on Insulator) substrate. The SOI substrate has a laminated construction in which an oxide layer (for example, SiO$_2$) is inserted between a first silicon substrate and a second silicon substrate.

The first silicon substrate 2 forms the upper surface side, and the second silicon substrate 6 forms the lower surface side via the oxide layer 5. A cavity (a concave portion) is formed on the second silicon substrate 6, and a diaphragm 3 is formed by the oxide layer and the first silicon substrate 2 on the cavity. In FIGS. 1A and 1B, an area of the diaphragm 3 is indicated by a dotted line. Around the diaphragm 3, a fixed area 4, in which no deformation occurs even if pressure is applied to the first silicon substrate 2, is provided.

The diaphragm 3 is in a rectangular shape as seen in a plane. Piezo elements B to E are formed approximately in the centers of respective edges of the diaphragm 3. As illustrated in FIGS. 1A, 1B, and 2, the first piezo element B and the second piezo element C are connected in series through a first output terminal (output pad) 10. Further, the third piezo element D and the fourth piezo element E are connected in series through a second output terminal (output pad) 11.

The first piezo element B and the third piezo element D are connected together through an input terminal (input pad) 12, and the second piezo element C and the fourth piezo element E are connected together through a ground terminal (ground pad) 13.

As illustrated in FIGS. 1A and 1B, the first output terminal (output pad) 10, the second output terminal (output pad) 11, the input terminal (input pad) 12, and the ground terminal (ground pad) 13 are all formed on the surface of the fixed area 4.

The first output terminal (output pad) 10, the second output terminal (output pad) 11, the input terminal (input pad) 12, the ground terminal (ground pad) 13, and connection interconnections extending from the respective pads are formed as plating layers of a good conductor such as Al or Au or sputtered layers.

Each of the piezo elements B to E is so configured that at least three semiconductor resistive layers are arranged in parallel at predetermined intervals on a surface of the diaphragm 3, and the semiconductor resistive layers arranged in parallel are electrically connected in series by semiconductor interconnection layers having a lower resistance than that of the semiconductor resistive layers, and the semiconductor resistive layers on both sides of the arrangement are electrically connected to a semiconductor connection layer having a lower resistance than that of the semiconductor resistive layers, respectively.

Each of the piezo elements B to E is formed by providing a P+ type semiconductor layer on the surface of the diaphragm 3. In the embodiment of the invention illustrated in FIGS. 1A and 1B, each of the piezo elements B to E is formed in a meander shape in which three P+ type semiconductor layers 20 (20a, 20b, and 20c) are installed side by side at intervals as semiconductor resistive layers, and the respective P+ type semiconductor resistive layers 20 are connected to the P++ type semiconductor layers 21 (21a and 21b) as the semiconductor interconnection layers. The respective P+ type semiconductor layers 20 are in an elongated shape.

The length direction of the P+ type semiconductor layers 20 that form the respective piezo elements B to E is so restricted that when the diaphragm 3 is deformed by pressure, the resistance values of the second piezo element C and the third piezo element D become larger and the resistance values of the first piezo element B and the fourth piezo element E become smaller. The resistance values of the respective piezo elements B to E (when no deformation occurs) are in the range of about 3 kΩ to 7 kΩ.

As illustrated in FIGS. 1A and 1B, at both ends of the respective piezo elements B to E formed in the meander shape, a pair of P++ type interconnection layers 25 and 26 is connected as the semiconductor connection layers including the P++ type semiconductor layers. Aspect ratios of the respective P++ type interconnection layers 25 and 26 are restricted for the bridge resistance adjustment. Of the pair of P++ type interconnection layers 25 and 26, one P++ type interconnection layer 25 is connected to the end portion of the piezo elements B to E that is relatively spaced apart from the end of the diaphragm 3 in a direction of the center of the diaphragm 3 in comparison to the other P++ type interconnection layer 26, and its drawing length is lengthened. Further, as illustrated in FIGS. 1A and 1B, the width of the P++ type interconnection layer 25 is set to be larger than the width of the P++ type interconnection layer 26. The resistance values of the respective P++ type interconnection layers 25 and 26 are in the range of about 120Ω to 250Ω.

As illustrated in FIGS. 1A and 1B, a portion of at least one P++ type interconnection layer 25 is formed to extend to the surface of the diaphragm 3.

As illustrated in FIG. 2, on the surface of the fixed area 4, in which no deformation occurs even if pressure is applied thereto, two P+ type semiconductor layers may be respectively provided between connection interconnections of the first piezo element B and the second piezo element C and between the connection interconnections of the third piezo element D and the fourth piezo element E, and a first adjustment resistor 28 for the bridge resistance adjustment, which is connected in series to the respective piezo elements B to E, may be formed. The resistance value of the first adjustment resistor 28 is in the range of about 30Ω to 40Ω.

As illustrated in FIG. 2, the first output terminals (output pads) 10 may be respectively installed between the connection interconnection of the first piezo element B and one first adjustment resistor 28, between the connection interconnection of the second piezo element C and the other first adjustment resistor 28, and between the connection interconnections of the respective first adjustment resistors 28. That is, three first output terminals (output pads) 10 may be installed in total.

Further, as illustrated in FIG. 2, the second output terminals (output pads) 11 may be respectively installed between the connection interconnection of the third piezo element D and one first adjustment resistor 28, between the connection interconnection of the fourth piezo element E and the other first adjustment resistor 28, and between the connection interconnections of the respective first adjustment resistors 28. That is, three second output terminals (output pads) 11 may be installed in total.

It may be appropriately selected from the view point of the bridge resistance adjustment which of the first output terminals 10 and the second output terminals 11 is to be connected to an external circuit (not illustrated). In this case, by short-circuiting two output terminals 10 and 11, in addition to the selection of any one of the first output terminals 10 and the second output terminals 11, the first adjustment resistor 28 positioned between them may be in a non-use state to perform the bridge resistance adjustment. In this embodiment of the invention, the fine adjustment, which cannot be completely performed through the bridge resistance adjustment based on the connection selection of the first output terminals 10 and the second output terminals 11, is performed by adjustment of the aspect ratio of the P++ type interconnection layers 25 and 26 as described above.

Further, in this embodiment of the invention, as illustrated in FIG. 2, on the surface of the fixed area 4, in which no deformation occurs even if pressure is applied thereto, one P+ type semiconductor layer may be respectively provided between connection interconnections of the second piezo element C and the ground terminal (ground pad) 13 and between the connection interconnections of the third piezo element D and the input terminal (input pad) 12, and a second adjustment resistor 30 for the temperature characteristic adjustment, which is connected in series to the second piezo element C and the third piezo element D, may be formed.

Figure 3:
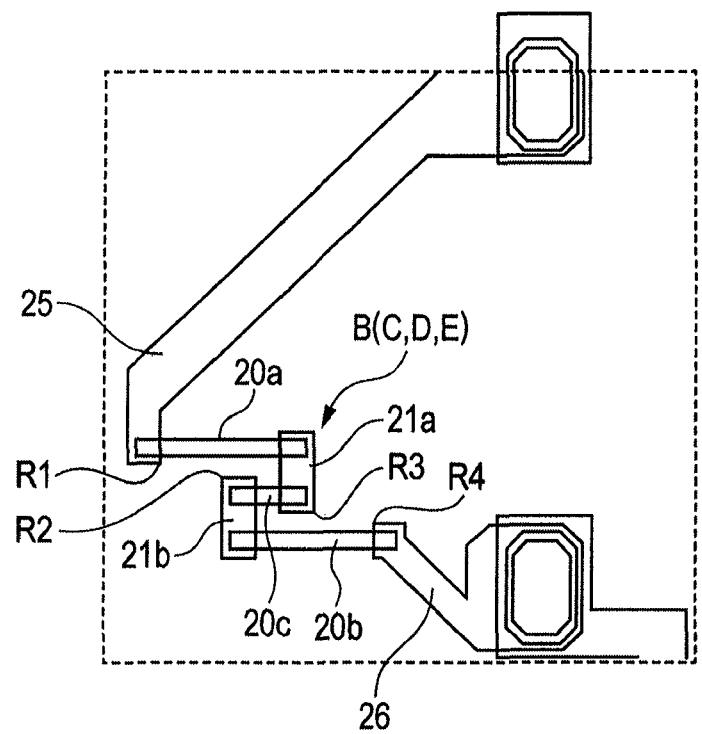
FIG. 3 is an enlarged plan view illustrating main parts of the pressure sensor of FIGS. 1A and 1B.

In the construction illustrated in FIGS. 1A, 1B, and 3, in the case where the ratio of the sheet resistance of the P++ type interconnection layers 25 and 26 to the sheet resistance of the P+ type semiconductor layers 20a to 20c is about 0.06 to about 0.28, the shortest distance between the P++ type interconnection layers 25 and 26 and the P++ type semiconductor layers 21a and 21b is 5 μm to 20 μm. In this case, it is preferable that the shortest distance be a distance between the corner portion of the P++ semiconductor layer that extends from the respective P+ type semiconductor layers on both sides of the arrangement and the corner portion of the P++ type interconnection layer that is nearest to the corner portion of the P++ type semiconductor layer.

According to this configuration, although the entire size of the piezoresistive pressure sensor is miniaturized (although the interconnection is miniaturized) while the arrangement shape of the semiconductor layer is not changed but is similarly maintained, it is not required that the P++ type semiconductor layer is remarkably near the nearest P++ type interconnection layer. Accordingly, the electric field distribution becomes uniform, and thus the ESD breakdown is prevented from occurring.

Further, in this embodiment of the invention, as clearly illustrated in FIG. 3, in the construction in which each of the piezo elements B to E is so configured that the semiconductor resistive layers 20a, 20b, and 20c, which are arranged in parallel on the surface of the diaphragm 3 as described above, are electrically connected in series by the semiconductor interconnection layers 21a and 21b having a lower resistance than that of the semiconductor resistive layers 20a, 20b, and 20c, and the semiconductor resistive layers 20a and 20b on both sides of the arrangement are electrically connected to the semiconductor connection layers 25 and 26 having a lower resistance than that of the semiconductor resistive layers 20a and 20b, one semiconductor resistive layer 20a on both sides of the arrangement is formed to be relatively longer than the adjacent semiconductor resistive layer 20c, and thus the corner portion R1 of the semiconductor connection layer 25 that extends from the one semiconductor resistive layer 20a on both sides of the arrangement is separated from the corner portion R2 of the semiconductor interconnection layer 21b that is nearest to the corner portion R1, and the corner portion R4 of the semiconductor connection layer 26 that extends from the other semiconductor resistive layer 20b on both sides of the arrangement is separated from the corner portion R3 of the semiconductor interconnection layer 21a that is nearest to the corner portion R4. In this case, it is preferable that the distance between the corner portions R1 and R4 and the corner portions R2 and R3 be equal to or longer than 14 μm.

According to the above-described construction, the respective semiconductor resistive layers 20a and 20b on both sides of the arrangement are formed to be relatively longer than the adjacent semiconductor resistive layer 20c, and thus the corner portion R1 (R4) of the semiconductor connection layer 25 (26) that extends from the respective semiconductor resistive layers 20a and 20b on both sides of the arrangement and the corner portion R2 (R3) of the semiconductor interconnection layer 21b (21a) that is nearest to the corner portion R1 (R4), between which the ESD breakdown may easily occur, are separated from each other. Accordingly, although the entire size of the piezoresistive pressure sensor is miniaturized (although the interconnection is miniaturized) while the arrangement shape of the semiconductor layer is not changed but is similarly maintained, it is not required that the corner portions R1 and R2 (R3 and R4) are remarkably near each other, and thus the electric field distribution becomes uniform and the ESD breakdown is prevented from occurring.

Figure 4:
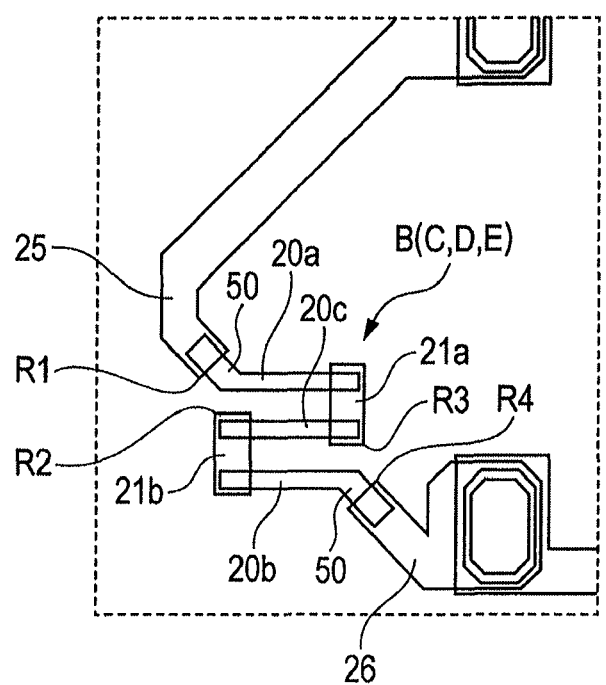
FIG. 4 is an enlarged plan view illustrating main parts of the pressure sensor according to a modified example of FIG. 3.

FIG. 4 illustrates a modified example of the above-described embodiment of the invention. In this modified example, parallel opposite portions of all the semiconductor resistive layers 20a, 20b, and 20c, which are arranged in parallel, have the same length, and one end of the semiconductor resistive layer 20a (20b) on both sides of the arrangement is bent (a bent portion 50) so that the corner portion R1 (R4) is spaced apart from the corner portion R2 (R3) of the semiconductor interconnection layer 21b (20a) that is nearest to the corner portion R1 (R4). Accordingly, as a whole, the respective semiconductor resistive layers 20a and 20b on both sides of the arrangement are formed to be relatively longer than the adjacent semiconductor resistive layer 20c. In this case, in addition to the above-described working effect, it is not required to change the position of the element resistor (semiconductor resistive layer) to gain a benefit. In this case, it is preferable that the distance between the corner portions R1 and R4 and the corner portions R2 and R3 be equal to or longer than 14 µm, and the length of the semiconductor resistive layer 20 be 20 µm to 30 µm.

The present invention is not limited to the above-described embodiments, and diverse modifications may be made within the range that does not deviate from the gist of the invention. For example, although in the above-described embodiments, three semiconductor resistive layers are used, the number of semiconductor resistive layers is not limited thereto, and four or more semiconductor resistive layers may be used.

It should be understood by those skilled in the art that various modifications, combinations, sub-combinations and alterations may occur depending on design requirements and other factors insofar as they are within the scope of the appended claims of the equivalents thereof.

What is claimed is:

1. A piezoresistive pressure sensor comprising a diaphragm disposed on a silicon substrate, and a plurality of piezo elements of which resistance values are changed according to deformation of the diaphragm,
   wherein each of the piezo elements is so configured that at least three semiconductor resistive layers are arranged in parallel at predetermined intervals on a surface of the diaphragm, and the respective semiconductor resistive layers arranged in parallel are electrically connected in series by semiconductor interconnection layers having a lower resistance than that of the semiconductor resistive layers, and the semiconductor resistive layers on both sides of the arrangement are electrically connected to semiconductor connection layers having a lower resistance than that of the semiconductor resistive layers, respectively, and
   wherein in the case where a ratio of sheet resistance of the semiconductor interconnection layers to sheet resistance of the semiconductor resistive layers is about 0.06 to about 0.28, the shortest distance between the semiconductor interconnection layer and the semiconductor connection layer is about 5 µm to about 20 µm.

2. The piezoresistive pressure sensor according to claim 1, wherein the shortest distance is a distance between a corner portion of the semiconductor connection layer that extends from the semiconductor resistive layers on both sides of the arrangement and a corner portion of the semiconductor interconnection layer that is nearest to the corner portion of the semiconductor connection layer.

3. The piezoresistive pressure sensor according to claim 1, wherein the semiconductor resistive layers on both sides of the arrangement are formed to be relatively longer than the adjacent semiconductor resistive layer, and the corner portion of the semiconductor connection layer that extends from the semiconductor resistive layers on both sides of the arrangement is separated from the corner portion of the semiconductor interconnection layer that is nearest to the corner portion of the semiconductor connection layer.

4. The piezoresistive pressure sensor according to claim 1, wherein parallel opposite portions of all the semiconductor resistive layers which are arranged in parallel have the same length, and one end of the semiconductor resistive layer on both sides of the arrangement is bent so that the corner portion thereof is spaced apart from a corner portion of the semiconductor interconnection layer which is nearest to the corner portion of the semiconductor resistive layer.

5. A piezoresistive pressure sensor comprising a diaphragm disposed on a silicon substrate, and a plurality of piezo elements of which resistance values are changed according to deformation of the diaphragm,
   wherein each of the piezo elements is so configured that at least three semiconductor resistive layers are arranged in parallel at predetermined intervals on a surface of the diaphragm, and the respective semiconductor resistive layers arranged in parallel are electrically connected in series by semiconductor interconnection layers having a lower resistance than that of the semiconductor resistive layers, and the semiconductor resistive layers on both sides of the arrangement are electrically connected to semiconductor connection layers having a lower resistance than that of the semiconductor resistive layers, respectively, and
   wherein parallel opposite portions of all the semiconductor resistive layers which are arranged in parallel have the same length, and one end of the semiconductor resistive layer on both sides of the arrangement is bent so that the corner portion thereof is spaced apart from a corner portion of the semiconductor interconnection layer which is nearest to the corner portion of the semiconductor resistive layer.

* * * * *